US012699837B2

(12) United States Patent
Laslo et al.

(10) Patent No.: US 12,699,837 B2
(45) Date of Patent: Aug. 4, 2026

(54) COMPUTE MANAGEMENT ENGINE IN AN ARTIFICIAL INTELLIGENCE SYSTEM

(71) Applicant: Microsoft Technology Licensing, LLC, Redmond, WA (US)

(72) Inventors: Ori Laslo, Rehovot (IL); Gilad Kirshenboim, Petach Tiqva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 18/483,307

(22) Filed: Oct. 9, 2023

(65) Prior Publication Data

US 2025/0117578 A1    Apr. 10, 2025

(51) Int. Cl.
*G06F 40/20* (2020.01)
*G06F 17/16* (2006.01)

(52) U.S. Cl.
CPC .............. *G06F 40/20* (2020.01); *G06F 17/16* (2013.01)

(58) Field of Classification Search
CPC ...... G06F 40/20; G06F 17/16; G06F 13/1668; G06F 3/0679; G06F 3/0604; G06F 9/5016; G06F 12/0804; G06F 12/0811; G06F 13/18; G06F 9/5027; G06F 3/061; G06F 3/0659; G06F 12/023; G06F 13/1678; G06F 12/02; G06F 13/16; G06F 15/8046; G06F 3/067; G06F 3/0655; G06F 7/5443; G06F 21/6245; G06F 9/5094; G06F 13/1621;

(Continued)

(56) References Cited

U.S. PATENT DOCUMENTS 12,174,754 B2 * 12/2024 Kida ...................... H04L 9/3268
2021/0201110 A1 * 7/2021 Qin ....................... G06N 3/0499

(Continued)

OTHER PUBLICATIONS

Choi, et al., "Unleashing the Potential of PIM: Accelerating Large Batched Inference of Transformer-Based Generative Models", IEEE Computer Architecture Letters, vol. 22, No. 2, Jul.-Dec. 2023, pp. 113-116.

(Continued)

*Primary Examiner* — Abdelali Serrou
(74) *Attorney, Agent, or Firm* — Shook, Hardy & Bacon L.L.P.

(57) ABSTRACT

Methods, systems, and computer storage media for providing compute management using a compute management engine in an artificial intelligence (AI) system. A compute management engine supports dynamically switching between two modes of operation for an inference phase of a generative artificial AI model. The compute management engine employs a bypass engine that causes prompt stage operations to be executed without an in-memory compute engine and causes auto-regression stage operations to be executed with the in-memory compute engine. In operation, an inference phase operation is accessed. When the inference phase operation is a prompt stage operation, the inference phase operation is executed without an in-memory compute engine. When the inference phase operation is an auto-regressive stage operation, the inference phase operation is executed with the in-memory compute engine. Memory output is generated for the inference phase operation to cause a processor to output a processor output for the inference phase operation.

20 Claims, 9 Drawing Sheets

300

302 — ACCESS A PROMPT STAGE OPERATION ASSOCIATED WITH A GENERATIVE AI MODEL

304 — CAUSE THE PROMPT STAGE OPERATION TO BYPASS AN IN-MEMORY COMPUTE ENGINE

306 — EXECUTE THE PROMPT STAGE OPERATION WITHOUT USING THE IN-MEMORY COMPUTE ENGINE

308 — ACCESS AN AUTO-REGRESSIVE STAGE OPERATION ASSOCIATED WITH THE GENERATIVE AI MODEL

310 — CAUSE THE AUTO-REGRESSIVE STAGE OPERATION TO BE EXECUTED USING THE IN-MEMORY COMPUTE ENGINE

312 — EXECUTE THE AUTO-REGRESSIVE STAGE OPERATION USING THE IN-MEMORY COMPUTE ENGINE

(58) Field of Classification Search

CPC ......... G06F 12/0862; G06F 2207/4824; G06F 2212/6026; G06F 16/252; G06F 3/0613; G06F 3/0631; G06F 9/4843; G06F 11/3433; G06F 3/011; G06F 3/017; G06F 3/0658; G06F 16/986; G06F 18/22; G06F 21/53; G06F 21/54; G06F 21/554; G06F 2221/033; G06F 2221/034; G06F 30/27; G06F 40/30; G06F 7/50; G06F 7/523; G06F 8/41; G06F 9/30094; G06F 11/1476; G06F 11/22; G06F 11/3006; G06F 11/3024; G06F 12/0207; G06F 12/0253; G06F 12/0638; G06F 12/0646; G06F 13/4282; G06F 15/7807; G06F 15/8023; G06F 16/27; G06F 21/566; G06F 2203/011; G06F 2212/1024; G06F 2212/7205; G06F 2212/7211; G06F 3/0346; G06F 3/0647; G06F 3/0656; G06F 11/1004; G06F 12/0238; G06F 12/0692; G06F 12/0879; G06F 12/0893; G06F 13/1663; G06F 13/4221; G06F 16/3329; G06F 16/9024; G06F 17/10; G06F 17/153; G06F 18/231; G06F 2201/81; G06F 30/30; G06F 5/01; G06F 7/501; G06F 9/4881; G06F 9/544; G06F 1/035; G06F 15/7839; G06F 21/6254; G06F 2201/865; G06F 3/0614; G06F 3/0619; G06F 3/0632; G06F 40/284; G06F 7/06; G06F 7/48; G06F 9/30061; G06F 9/4411; G06F 9/5022; G06F 9/5038; G06F 9/505; G06F 11/3409; G06F 15/7875; G06F 15/7889; G06F 17/18; G06F 18/214; G06F 18/217; G06F 3/013; G06F 3/0673; G06F 40/205; G06F 7/58; G06F 8/441; G06F 8/443; G06F 9/3001; G06F 9/3004; G06F 9/30145; G06F 9/3887; G06F 9/44505; G06F 9/45558; G06F 9/4887; G06F 1/022; G06F 1/26; G06F 11/1608; G06F 11/183; G06F 11/2215; G06F 11/27; G06F 11/3447; G06F 11/3495; G06F 11/3624; G06F 15/17318; G06F 15/17325; G06F 15/78; G06F 15/7871; G06F 16/148; G06F 16/156; G06F 16/168; G06F 16/212; G06F 16/24534; G06F 16/248; G06F 16/3344; G06F 16/35; G06F 16/355; G06F 16/36; G06F 16/783; G06F 16/90332; G06F 16/93; G06F 17/11; G06F 18/213; G06F 18/2433; G06F 18/25; G06F 2009/45595; G06F 21/78; G06F 2111/10; G06F 2203/012; G06F 2203/04806; G06F 2203/04808; G06F 3/0304; G06F 3/04845; G06F 3/04847; G06F 3/04855; G06F 3/04883; G06F 3/0607; G06F 3/0616; G06F 3/0629; G06F 3/0653; G06F 3/0683; G06F 30/20; G06F 8/314; G06F 8/65; G06F 9/30007; G06F 9/44521; G06F 9/4496; G06F 9/451; G06F 9/455; G06F 94/46; G06F 9/50; G06F 9/5011; G06F 9/5044; G06F 9/5072; G06F 9/5083; G06F 9/54; G06F 1/3225; G06F 1/3243; G06F 1/3287; G06F 1/3296; G06F 11/0721; G06F 11/073; G06F 11/0751; G06F 11/076; G06F 11/0772; G06F 11/0793; G06F 11/2263; G06F 11/277; G06F 11/3037; G06F 11/3051; G06F 11/3058; G06F 11/3075; G06F 11/3089; G06F 11/3414; G06F 11/3438; G06F 11/3442; G06F 11/3452; G06F 11/3466; G06F 11/349; G06F 11/3612; G06F 11/3648; G06F 11/3652; G06F 11/3656; G06F 12/00; G06F 12/0261; G06F 12/0802; G06F 13/1673; G06F 13/1689; G06F 13/20; G06F 15/163; G06F 15/7817; G06F 15/785; G06F 15/7882; G06F 15/8015; G06F 16/20; G06F 16/2465; G06F 16/285; G06F 16/288; G06F 16/33; G06F 16/332; G06F 16/90339; G06F 16/9535; G06F 17/142; G06F 17/15; G06F 18/15; G06F 18/211; G06F 18/24143; G06F 18/24147; G06F 18/2415; G06F 18/253; G06F 18/27; G06F 18/29; G06F 2009/45575; G06F 21/602; G06F 21/64; G06F 2123/02; G06F 2209/5011; G06F 2209/5017; G06F 2209/502; G06F 2209/509; G06F 2209/543; G06F 2209/548; G06F 2212/1016; G06F 2212/1041; G06F 2212/455; G06F 3/064; G06F 40/295; G06F 40/35; G06F 40/58; G06F 8/20; G06F 8/33; G06F 8/37; G06F 8/447; G06F 9/06; G06F 9/30014; G06F 9/3016; G06F 9/30189; G06F 9/321; G06F 9/3851; G06F 9/3888; G06F 9/4451; G06F 9/449; G06F 9/5066; G06F 9/546

See application file for complete search history.

(56)          References Cited

U.S. PATENT DOCUMENTS

| | | | | |
|---|---|---|---|---|
| 2022/0327405 A1* | 10/2022 | Ngo | | G06N 5/04 |
| 2023/0110230 A1* | 4/2023 | Kida | | G06F 21/602 |
| | | | | 713/193 |
| 2023/0168835 A1* | 6/2023 | Grosz | | G06F 21/79 |
| | | | | 713/193 |
| 2025/0085973 A1* | 3/2025 | Long | | G06F 9/3888 |
| 2025/0086090 A1* | 3/2025 | R | | G06F 8/443 |
| 2025/0103868 A1* | 3/2025 | Sieniawski | | G06N 3/0475 |

OTHER PUBLICATIONS

Hong, et al., "DFX: A Low-latency Multi-FPGA Appliance for Accelerating Transformer-based Text Generation", arXiv:2209.10797v1, Sep. 22, 2022, 15 pages.

International Search Report and Written Opinion received for PCT Application No. PCT/US2024/049353, mailed on Jan. 20, 2025, 18 pages.

Pope, et al., "Efficiently Scaling Transformer Inference", arXiv:2211.05102v1, Nov. 9, 2022, 18 pages.

* cited by examiner

100

ARTIFICIAL INTELLIGENCE SYSTEM
100A

COMPUTE MANAGEMENT ENGINE
110

COMPUTE MANAGEMENT OPERATIONS
112

MEMORY
114

PROCESSOR
120

PROCESSOR COMPUTE ENGINE
122

MACHINE LEARNING ENGINE
140

MACHINE LEARNING MODEL (LLM)
142

APPLICATION
150

NETWORK
100B

ARTIFICIAL INTELLIGENCE CLIENT
130

APPLICATION CLIENT
132

APPLICATION INTERFACE DATA
134

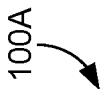
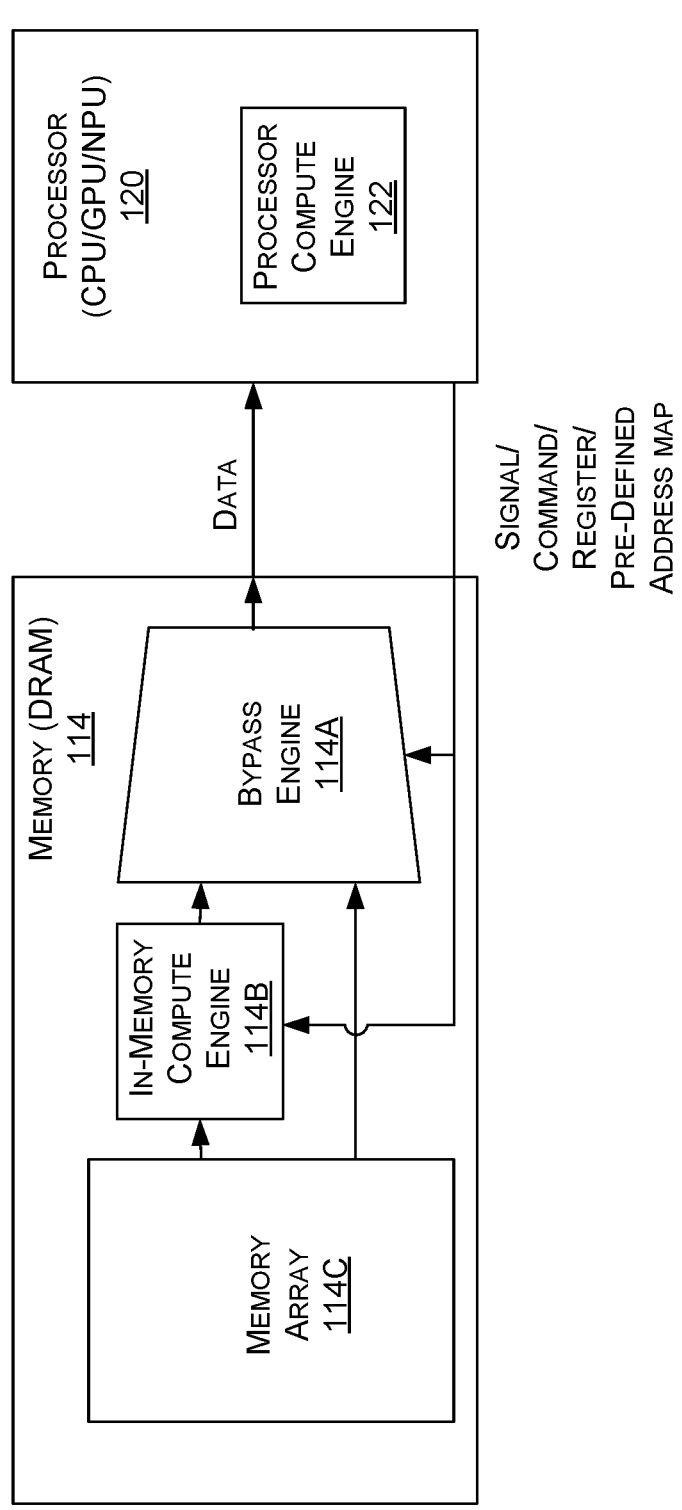
FIG. 2B

300

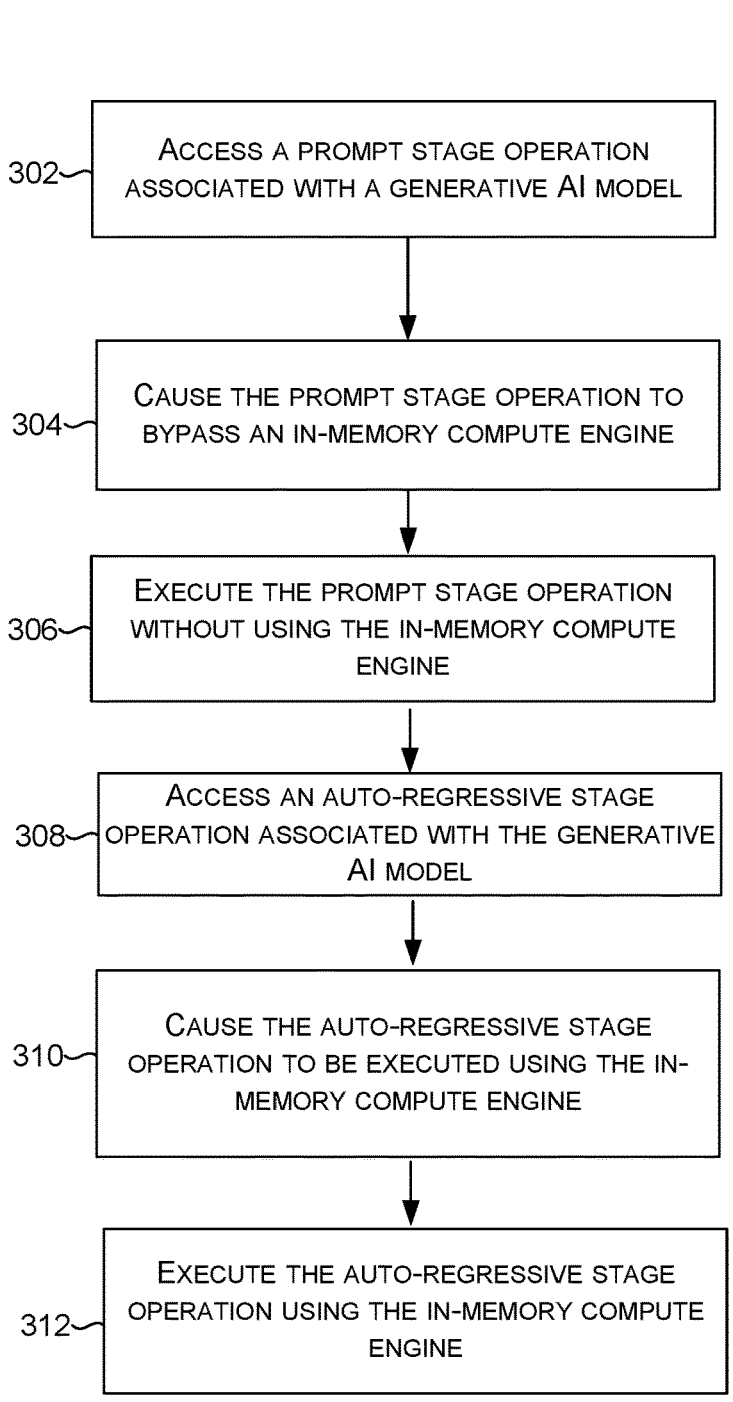

302 — ACCESS A PROMPT STAGE OPERATION ASSOCIATED WITH A GENERATIVE AI MODEL

304 — CAUSE THE PROMPT STAGE OPERATION TO BYPASS AN IN-MEMORY COMPUTE ENGINE

306 — EXECUTE THE PROMPT STAGE OPERATION WITHOUT USING THE IN-MEMORY COMPUTE ENGINE

308 — ACCESS AN AUTO-REGRESSIVE STAGE OPERATION ASSOCIATED WITH THE GENERATIVE AI MODEL

310 — CAUSE THE AUTO-REGRESSIVE STAGE OPERATION TO BE EXECUTED USING THE IN-MEMORY COMPUTE ENGINE

312 — EXECUTE THE AUTO-REGRESSIVE STAGE OPERATION USING THE IN-MEMORY COMPUTE ENGINE

FIG. 3

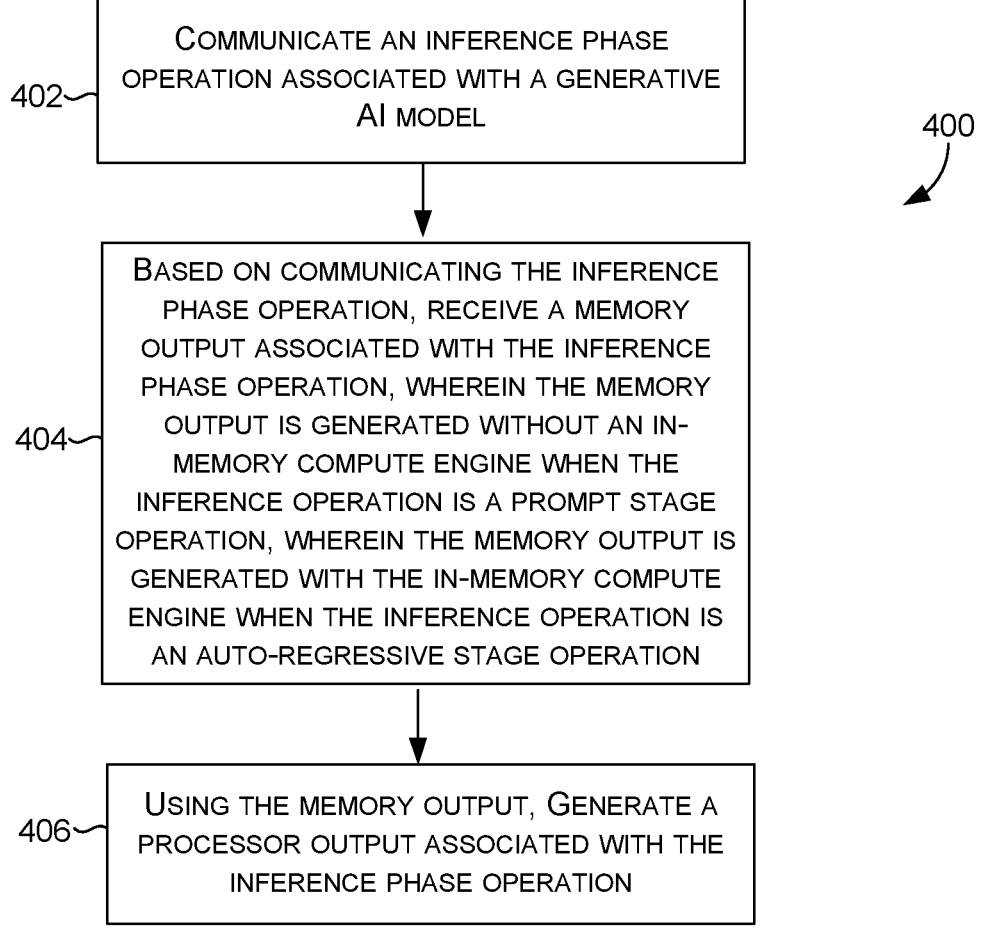

402 — COMMUNICATE AN INFERENCE PHASE OPERATION ASSOCIATED WITH A GENERATIVE AI MODEL

400

404 — BASED ON COMMUNICATING THE INFERENCE PHASE OPERATION, RECEIVE A MEMORY OUTPUT ASSOCIATED WITH THE INFERENCE PHASE OPERATION, WHEREIN THE MEMORY OUTPUT IS GENERATED WITHOUT AN IN-MEMORY COMPUTE ENGINE WHEN THE INFERENCE OPERATION IS A PROMPT STAGE OPERATION, WHEREIN THE MEMORY OUTPUT IS GENERATED WITH THE IN-MEMORY COMPUTE ENGINE WHEN THE INFERENCE OPERATION IS AN AUTO-REGRESSIVE STAGE OPERATION

406 — USING THE MEMORY OUTPUT, GENERATE A PROCESSOR OUTPUT ASSOCIATED WITH THE INFERENCE PHASE OPERATION

FIG. 4

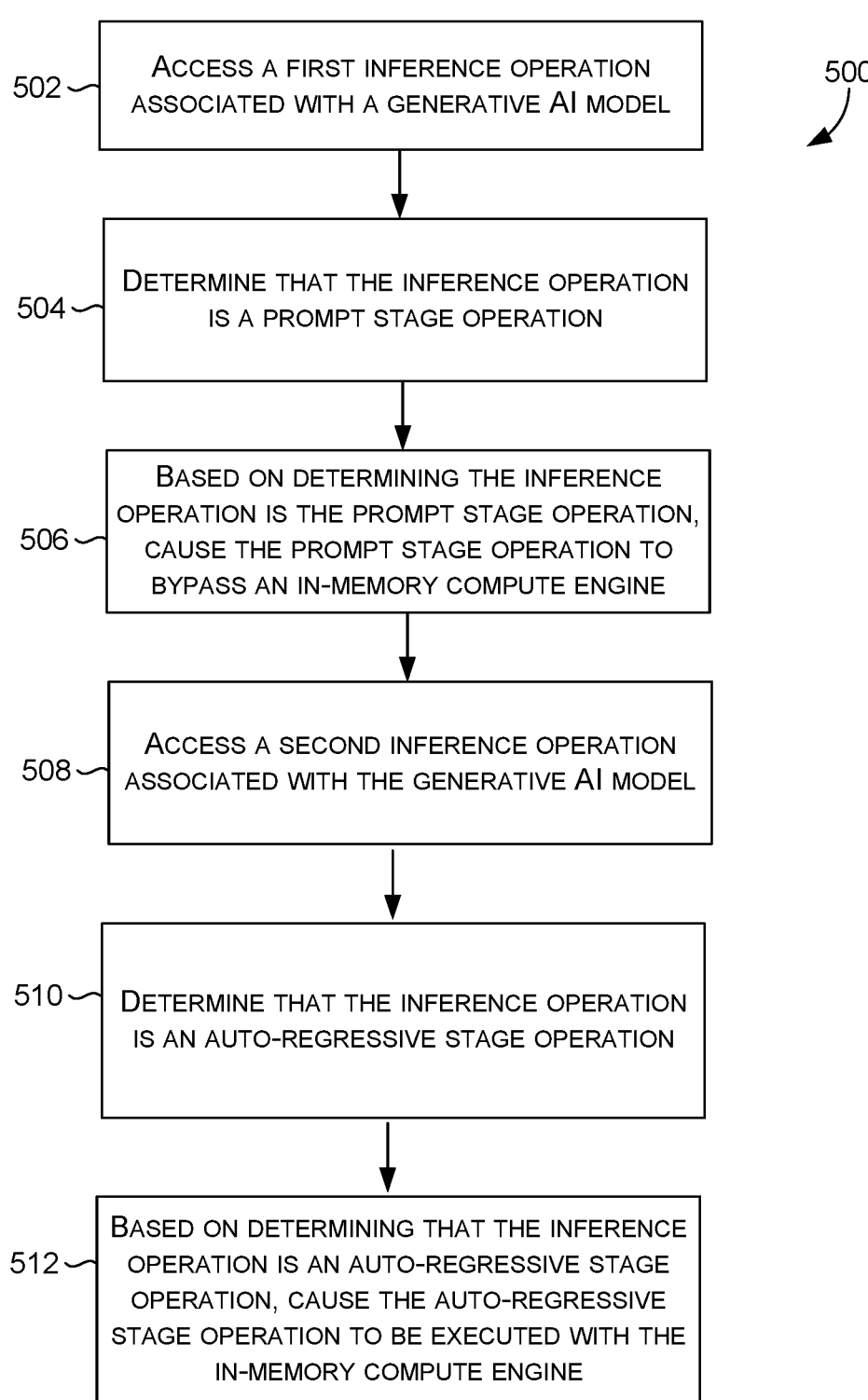

502 — ACCESS A FIRST INFERENCE OPERATION ASSOCIATED WITH A GENERATIVE AI MODEL

504 — DETERMINE THAT THE INFERENCE OPERATION IS A PROMPT STAGE OPERATION

506 — BASED ON DETERMINING THE INFERENCE OPERATION IS THE PROMPT STAGE OPERATION, CAUSE THE PROMPT STAGE OPERATION TO BYPASS AN IN-MEMORY COMPUTE ENGINE

508 — ACCESS A SECOND INFERENCE OPERATION ASSOCIATED WITH THE GENERATIVE AI MODEL

510 — DETERMINE THAT THE INFERENCE OPERATION IS AN AUTO-REGRESSIVE STAGE OPERATION

512 — BASED ON DETERMINING THAT THE INFERENCE OPERATION IS AN AUTO-REGRESSIVE STAGE OPERATION, CAUSE THE AUTO-REGRESSIVE STAGE OPERATION TO BE EXECUTED WITH THE IN-MEMORY COMPUTE ENGINE

COMPUTE MANAGEMENT ENGINE IN AN ARTIFICIAL INTELLIGENCE SYSTEM

BACKGROUND

Users rely on computing environments with applications and services to accomplish computing tasks. Users can interact with different types of applications and services that are supported by artificial intelligence (AI) systems. In particular, generative AI systems can support text generation, image generation, music and audio generation, video generation, and data synthesis. Generative AI can refer to a class of AI systems and algorithms that are designed to generate new data or content that is similar to, or in some cases, entirely different from data they are trained on. Generative AI can encompass a wide range of models and algorithms designed to generate new data or content. For example, Large Language Models (LLMs) are a specific class of generative AI models that are primarily focused on generating human-like text. LLMs and other generative AI models leverage computing architectures, extensive pre-training on datasets, and fine-tuning for specific tasks to support natural language processing applications from chat bots and virtual assistance to content generation and language translation.

SUMMARY

Various aspects of the technology described herein are generally directed to systems, methods, and computer storage media for, among other things, providing compute management using a compute management engine of an artificial intelligence system. A compute management engine supports dynamically switching between two modes of operation associated with an inference phase for a generative artificial intelligence (AI) model. In particular, the inference phase includes: prompt inference (e.g., prompt stage operations) and auto-regression inference (e.g., auto-regression stage operations)—where prompt stage operations are optimized for compute and auto-regression stage operations are optimized for memory throughput. The compute management engine operations include dynamically switching modes to eliminate in-memory compute inefficiency when executing inference phase operations.

The compute management engine includes memory (e.g., Dynamic Random Access Memory "DRAM") that contains a designated amount of compute (e.g., in-memory compute engine) that is capable of processing compute for a generative AI model (e.g., a vector dot product of a Large Language Model "LLM"). The compute management engine employs a bypass engine that causes prompt stage operations to be executed without an in-memory compute engine and causes auto-regression stage operations to be executed with an in-memory compute engine. During the prompt stage, a processor of the compute management engine performs readouts from the memory—while bypassing the in-memory compute, and the processor performs computations using its highly-efficient process node (i.e., a processor compute engine). During the auto-regressive stage, the processor utilizes the in-memory compute—trading off compute efficiency for improved throughput from memory (e.g., readouts of result vectors).

Conventionally, artificial intelligence systems are not configured with a comprehensive computing logic and infrastructure to efficiently provide compute management for an artificial intelligence system. For example, the two stages (i.e., prompt stage and auto-regressive stage) of inference for a generative AI model present bottlenecks. In particular, the prompt stage is limited by compute, as many tokens are being processed at the same time using the same number of model weights; and the auto-regressive stage is limited by memory bandwidth, as the compute is limited (e.g., processing only a single token at a time), but the model weights need to be re-fetched from memory for every new token. Such artificial intelligence systems lack integration with compute management operations that address both compute and memory bandwidth bottlenecks.

A technical solution—to the limitations of conventional artificial intelligence systems—can include the challenge of implementing a bypass engine to determine whether an inference phase operation is a prompt stage operation or an auto-regressive stage operation; implementing an in-memory compute engine that is bypassed for prompt stage operations while the in-memory compute engine executes auto-regressive stage operations; and providing compute management operations and interfaces via a compute management engine in an artificial intelligence system. As such, the artificial intelligence system can be improved based on compute management operations that operate to effectively perform inferences for a generative AI model.

In operation, an inference phase operation is accessed. The inference phase operation is associated with a generative AI model. The generative AI model operates with memory that supports executing inference phase operations. When the inference phase operation is a prompt stage operation, the inference phase operation is executed without an in-memory compute engine of the memory. And, when the inference phase operation is an auto-regressive stage operation, the inference phase operation is executed with the in-memory compute engine of the memory. Memory output is generated for the inference phase operation to cause a processor to output a processor output associated with the inference phase operation and the memory output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 2B is a block diagram of an exemplary artificial intelligence system that includes a compute management engine, in accordance with aspects of the technology described herein;

FIG. 3 provides a first exemplary method of providing compute management using a compute management engine, in accordance with aspects of the technology described herein;

FIG. 4 provides a second exemplary method of providing compute management using a compute management engine, in accordance with aspects of the technology described herein;

FIG. 5 provides a third exemplary method of providing compute management using a compute management engine, in accordance with aspects of the technology described herein;

DETAILED DESCRIPTION

Overview

Figure 1A:
FIGS. 1A and 1B are block diagrams of an exemplary artificial intelligence system that includes a compute management engine, in accordance with aspects of the technology described herein.

An artificial intelligence system refers to an artificial intelligence computing environment or architecture that includes the infrastructure and components that support the development, training, and deployment of artificial intelligence models. It provides necessary hardware, software, and frameworks for developers to create and run artificial intelligence applications. An artificial intelligence system may be a cloud-based AI solution that leverages cloud computing infrastructure to develop, train, deploy, and manage AI models and applications. AI models may specifically refer to generative AI models that are designed to generate new data or content that is similar to, or in some cases, entirely different from data they are trained on.

Artificial intelligence systems can include transformer models that are capable of running complex neural language processing tasks. Transformer models—also known as Large Language Models "LLM"—have applications in a wide range of industries. An LLM is a trained deep-learning model that can recognize, summarize, translate, predict, and generate content using very large datasets. LLMs and other types of generative AI models are associated with a training phase—where a model is taught to learn patterns, relationships, and knowledge from training datasets; and an inference phase—that includes making predictions, classifications, or generating outputs for real-world tasks or queries.

Unlike convolution neural networks, which are typically used for image tasks and mostly rely on convolution operations, transformer models are based on simple general matrix multiplication (GEMM) tasks, which can be further broken down to perform a dot product operation on two vectors. While CNN architectures are typically computationally heavy with a relatively small number of parameters, the architecture of transformer models result in the opposite—a very large number of parameters, with a fairly small number of operations. The LLM architecture can create challenges in that performance bottlenecks reside in the memory throughput and capacity rather than the compute engine.

Transformer models operate with memory accesses to retrieve a matrix of weights out of memory, together with a vector (either the input vector or partial result from previous stage of the model), and multiplying the two. This is true for the model's attention sub-layers, the FFN (feed-forward network), sub-layers, and for the final embedding layer. As vector-matrix multiplication is actually comprised of numerous vector-vector multiplications (dot product), it is fair to say that most memory accesses are used to read two vectors in order to perform a dot product on them. As such reading out the full vectors is inefficient.

As such, transformer models (also referred to herein a "generative AI models") require computational resources including processors and memory for the training phase and inference phase. The generative AI models operate with different types of processors (e.g., CPUs/GPUs/NPUs) in architectures that include multi-core CPUs or parallel processors including GPUs and TPUs. Memory can be used to store model parameters and intermediate data for the training phase and the inference phase. Memory requirements may depend on the size and the architecture of the generative AI models. By way of illustration, an LLM can support an inferencing phase that includes using a trained model to make predictions, draw conclusions, or generate output based on input data or patterns learned during the model's training phase. During inference phase, an LLM can use DRAM (Dynamic Random Access Memory) to store various components and data for making inferences. LLMs can store their pre-trained model parameters (e.g., weights and biases of the neural network layers) in DRAM, and when a new input is provided for inference, the model accesses these parameters from DRAM to make predictions.

The inference phase can be divided into two stages: a prompt stage and an auto-regressive stage. The prompt stage can include receiving and processing input as a batch of new tokens as part of the same inference. The prompt stage may operate based on a Key-Value (KV) cache technique, where a KV cache is created for tokens in a batch. During the prompt stage, the input is being digested. The auto-regressive state can include using the model to generate the tokens one-by-one, based on previous tokens, relying on reading the KV cache of previously-processed tokens, and adding the data of the new of only new tokens to the KV cache. This auto-regressive stage includes the model generating a response to the input from the prompt stage.

Conventionally, artificial intelligence systems are not configured with a comprehensive computing logic and infrastructure to efficiently provide compute management for an artificial intelligence system. The prompt stage and the auto-regressive stage can present different types of bottleneck challenges for the inferencing rate. The prompt stage is limited by compute, in that, the prompt stage operates based on a number of tokens that can be processed at the same time, using the same number of model weights. The auto-regressive stage is limited by the memory bandwidth, in that, compute can be limited (e.g., processing only a single token at a time), but the model weight needs to be re-fetched from memory for every new token.

As such, in order to reduce memory bandwidth requirements, in/near-memory compute techniques may be implemented to reduce the bandwidth between the processor (e.g., CPU/GPU/NPU) and the memory (e.g., DRAM), as in/near-memory can execute some compute in the memory and output the results from the computations. However, these techniques can be implemented with cost to compute capability, as any compute placed within the memory will be inefficient due to the memory's process node-which is optimized for memory but not for compute. As such, a more comprehensive artificial intelligence system with an alternative basis for performing compute management for inference can optimize both stages of the inference phase—including computing operates and interfaces for providing artificial intelligence functionality.

Embodiments of the present technical solution are directed to systems, methods, and computer storage media, for among other things, providing compute management using a compute management engine of an artificial intelligence system. A compute management engine supports dynamically switching between two modes of operation associated with an inference phase for a generative artificial intelligence (AI) model. In particular, the inference phase includes: prompt inference (e.g., a prompt stage operation) and auto-regression inference (e.g., an auto-regression stage operation)—where prompt stage operations are optimized for compute and auto-regression stage operations are optimized for memory throughput. The compute management engine operations eliminate in-memory compute inefficiency when executing inference phase operations. Compute management is provided using the compute management engine that is operationally integrated into the artificial intelligence system. The artificial intelligence system supports a compute management framework of computing components associated with providing memory that includes a bypass engine and an in-memory compute engine, and providing compute management for inference operations for a generative AI model.

At a high level, the compute management engine supports dynamically switching between two modes of operation, the first mode is associated with a prompt stage-optimizing compute during the inference phase; and the second mode is associated with an auto-regressive stage—optimizing memory (e.g., dynamic random access memory "DRAM") throughput. A memory device "memory" can be associated with the compute management engine having an in-compute engine that is capable of handling relatively small loads of compute for a generative AI model (e.g., vector dot product for LLMs). The memory can include a control mechanism to control whether the compute is used as part of a memory path or bypassed. For example, the control mechanism may be controlled using a dedicated signal, a control register within the memory, a pre-defined address map, and two types of read commands).

In operation, during the prompt stage, a processor can perform readouts from the memory while bypassing the in-memory compute engine, and execute the compute operations at the processor using a highly-efficient process node (e.g., processor compute engine). As the prompt stage is typically not limited by DRAM throughput—primarily operating in large batches of data—these operations optimize the performance of the prompt stage. During the auto-regressive stage, the processor can utilize the in-memory compute engine—that forfeits the compute efficiency for effective throughput through DRAM—to read the result vectors. As the compute load during the auto-regressive stage is lower, the tradeoff optimizes the overall inference phase. The operations of the compute management engine eliminate a key drawback of in-memory compute (i.e., low compute efficiency due to memory process node), which has previously prevented in-memory compute from being effectively employed in artificial intelligence systems.

Advantageously, the embodiments of the present technical solution include several inventive features (e.g., operations, systems, engines, and components) associated with an artificial intelligence system having a compute management engine. The compute management engine supports compute management operations used to implement a bypass engine to support bypassing execution of prompt stage operations with the in-memory compute engine while executing auto-regressive stage operations with the in-memory compute engine—and providing artificial intelligence system operations and interfaces via a compute management engine in an artificial intelligence system. The compute management operations are a solution to a specific problem (e.g., limitations in efficiently performing inference phase operations for a generative AI model) in an artificial intelligence system. The compute management engine provides ordered combination of operations for dynamically switching between two modes of operation associated with an inference phase for a generative artificial intelligence (AI) model—which improves computing operations in an artificial intelligence system. Moreover, the compute management engine eliminates low in-memory compute efficiency when executing inference phase operations.

Example Systems and Operations

Figure 1B:
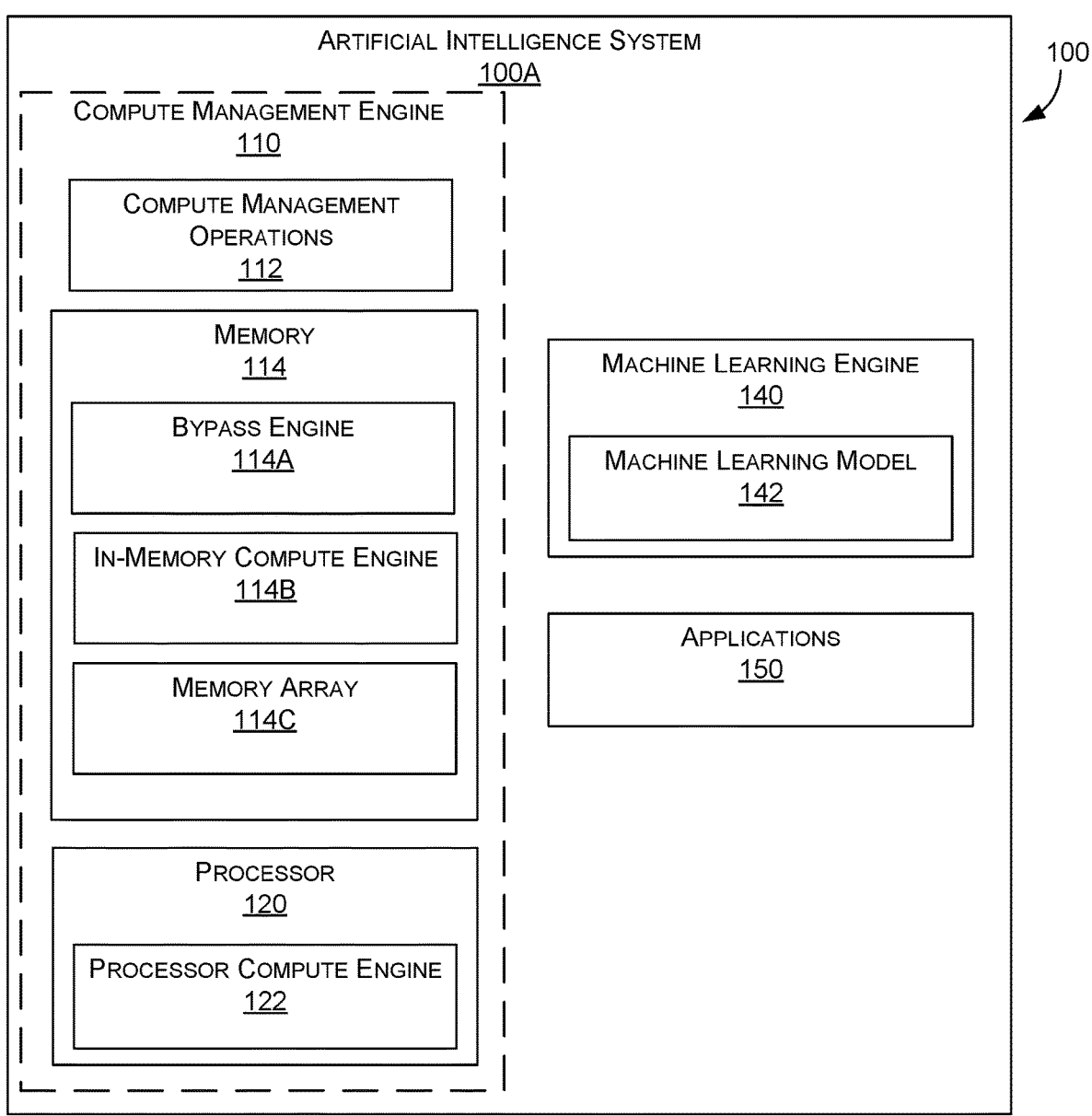

Aspects of the technical solution can be described by way of examples and with reference to FIGS. 1A-1B. FIG. 1A illustrates a cloud computing system (environment) 100 including artificial intelligence system 100A; network 100B; compute management engine 110 having compute management operations 112, memory 114; processor 120 and processor compute engine 122; artificial intelligence client 130, application client 132, and application interface data 134; and machine learning engine 140 including machine learning model 142 ("LLM 142").

The cloud computing environment 100 provides computing system resources for different types of managed computing environments. For example, the cloud computing environment 100 supports delivery of computing services-including servers, storage, databases, networking, software synthesis applications and services collectively "service(s)", and artificial intelligence system (e.g., artificial intelligence system 100A). A plurality of artificial intelligence clients (e.g., artificial intelligence client 130) include hardware or software that access resources in the cloud computing environment 100. Artificial intelligence client 130 can include an application or service that supports client-side functionality associated with cloud computing environment 100. The plurality of artificial intelligence clients can access computing components of the cloud computing environment 100 via a network (e.g., network 100B) to perform computing operations.

Artificial intelligence system 100A is responsible for providing an artificial intelligence computing environment or architecture that includes the infrastructure and components that support the development, training, and deployment of artificial intelligence models. Artificial intelligence system 100A is responsible for providing compute management associated with compute management engine 110. Artificial intelligence system 100A operates to support generating inferences for machine learning model 142 ("LLM" 142). Artificial intelligence system 100A can be integrated with components that support providing compute management for an inference phase of the LLM 142. Artificial intelligence system 100A provides an integrated operating environment based on a compute management framework of computing components associated with generating inferences for application 150 that operates with LLM 142, The artificial intelligence system 100A integrates compute management operations 112—that support dynamically switching between two modes of operation associated with an inference phase for a generative artificial intelligence (AI) model—and operates with artificial intelligence system operations and interfaces to effectively provide compute management for applications. For example, prompt stage operations are optimized for compute and auto-regression stage operations are optimized for memory throughput.

The compute management engine 110 is responsible for providing compute management operations 112 that support the functionality associated with the compute management engine 110. The compute management operations 112 are executed to support dynamically switching between two modes of operation associated with an inference phase for a generative artificial intelligence (AI) model. The compute management engine 110 includes memory 114 and processor 120 that operate together to execute inference phase operations. The compute management engine includes memory 114 (e.g., Dynamic Random Access Memory "DRAM") that contains a designated amount of compute (e.g., in-memory compute engine) that is capable of processing compute for LLM 142 associated with machine learning engine 140.

Machine learning engine 140 is a machine learning framework or library that operates as a tool for providing infrastructure, algorithms, capabilities for designing, training, and deploying machine learning models. The machine learning engine 140 can include pre-built functions and APIs that enable building and applying machine learning techniques. The machine learning engine 140 can provide a machine learning workflow from data processing and feature extraction to model training, evaluation, and deployment. The machine learning engine 140 can include LLM 142.

LLM 142 can refer to a type of machine learning model (e.g., transformer model). In particular, LLM 142 is a statistical model that can be used to predict the probability of a sequence of words of tokens in a natural language. LLM 142 can support natural language understanding including text generation and machine translation. LLM 142 can support contextual responses, answering questions, content generation, language translation, text summarization, task automation, learning and assistance, and accessibility tools. For example, a chat interface for a search engine and other chat interfaces associated with LLMs can produce based on inference phase operations executed for the LLMs.

Memory 114 supports storing and providing access to data and instructions for using the LLM 142 with application 150. The memory 114 can specifically be Dynamic Random Access Memory (DRAM)—a type of volatile semiconductor memory. Memory 114 supports the LLM 142 during the inference phase by offering a high-speed memory system for temporary data storage and retrieval. Memory can include an architecture of cells, rows and columns, sense amplifiers and I/O lines, and memory banks that support high-speed access, temporary storage, parallel access, and memory management. For example, memory 114 can be used to temporarily store model parameters from persistent storage (e.g., SSDs or HDDs). Memory 114 further includes a bypass engine, an in-memory compute, and a memory array as described herein in more detail.

Processor 120 supports executing instructions, performing computations and performing inference operations for the LLM 142. Processor 120 can execute machine instructions generated by LLM 142 during inference. These instructions include operations related to text processing, neural network calculations, and data manipulation. Processor 120 can coordinate memory access, including reading from memory 114 (e.g., DRAM) and cache for retrieving model parameters, input data, and intermediate results. Processor 120 includes processor compute engine 122 that executes instructions and manages memory for operations associated with LLM 142. The processor compute engine 122 is a highly-efficient process node of the processor 120 that provides compute capacity and power efficiencies (e.g., silicon capacity and power capacity) over in-memory compute.

Application 150 refers to a generative-AI-supported application that can be associated with a wide range of domains that operate based on natural language understanding and generation capabilities of LLM 142. Application 150 can support use cases from text generation and auto-completion to chat bots and virtual assistants. Application 150 can be integrated with LLM 142 (e.g., via an Application Programming Interface) and provide access to LLM 142 via a client (e.g., artificial intelligence client 130) that operates based on user interaction, sending queries or prompts, request processing, response handling, and display of results. LLM 142 can enhance the capabilities of application 150 by providing integrated LLM services.

By way of illustration, artificial intelligence client 130 can refer to a user's device. Application client 132 can a web browser, a mobile application, or any software that connects to the artificial intelligence system 100A. Application 150 is hosted in the artificial intelligence system 100A. Artificial intelligence system 100A processes requests from artificial intelligence client 130. In particular, a user interacts with application client 132 and provides input (e.g., a text prompt). The input may be a textual request, question, or instruction that the user wants LLM 142 to process. The user submits the input through the application client 132. The input along with any additional parameters or context is communicated to LLM 142 in a structured format, typically through a secure HTTPS connection.

Upon receiving the input, the artificial intelligence system 100A processes the request including passing the input through layers of an LLM 142, utilizing its pre-trained knowledge, and applying the components and neural network architecture of LLM 142 to generate a response. LLM 142 performs inference on the input, which involves making predictions based on the patterns and information learned during pre-training and fine-tuning. LLM 142 generates a response based on the input. LLM 142 generates a response, which can be in the form of text. The response can include answering questions, providing recommendations, completing texts, or any other language-related task, depending on the nature of the prompt associated with the input and the model's fine tuning.

LLM 142 sends the generated response back to the artificial intelligence client 130 (e.g., a structure data object that contains LLM 142's output). The artificial intelligence client 130 can receive the response and cause display of the response. The response can be part of application interface data 134 including response integrated into text, integrated into a chat interface, or used in other ways based on the application design. A request-response interaction where client sends a prompt, the LLM 142 processes the prompt, generates a response, and sends it back to the client for display or further action.

As such, the artificial intelligence system 100A can provide a compute management engine 110 that supports compute management for LLM 142. The compute management engine 110 can support dynamically switching between two modes of operation associated with an inference phase of LLM 142. The compute management engine supports LLM 142 that is integrated with application 150, such that, the LLM 142 can generate inferences—using memory 114 and processor 120—and the inferences are communicated to application intelligence client 130. The inferences for application 150 can be associated with a wide range of domains that are supported based on natural language understanding and generation capabilities.

With reference to FIG. 1B, FIG. 1B illustrates the artificial intelligence system 100A, compute management engine 110—having compute management operations 112, memory 114 having bypass engine 114A, in-memory compute engine 114B, and memory array 114C; processor 120 having processor compute engine 122; machine learning engine 140 having machine learning model 142; and application 150.

The compute management engine 110 is responsible for providing compute management for an artificial intelligence system. The compute management engine 110 includes compute management operations 112 that support providing the functionality associated with the compute management engine 110. The computing management engine 110 supports an inference phase that includes a prompt stage and an auto-regressive stage. The prompt stage can include receiving and processing input as a batch of new tokens as part of the same inference. The prompt stage may operate based on a Key-Value (KV) cache technique, where a KV cache is created for tokens in a batch. During the prompt stage, the input is being digested. The auto-regressive state can include using the model to generate the tokens one-by-one, based on previous tokens, relying on reading the KV cache of previously-processed tokens, and adding the data of the new of only new tokens to the KV cache. This auto-regressive stage includes the model generating a response to the input from the prompt stage.

The compute management engine 110 executes inference phase operations using memory 114 that includes bypass engine 114A, in-memory compute engine 114B, memory array 114C and processor 120 that includes processor compute engine 122. The compute management engine 110 supports dynamically switching between two modes of operation, the first mode is associated with the prompt stage—optimizing compute during the inference phase; and the second mode is associated with an auto-regressive stage—optimizing memory (e.g., dynamic random access memory "DRAM") throughput. Memory 114 includes the in-compute engine 114B that is capable of handling loads of compute for LLM 142. The memory 114 is associated with a mechanism executed via the bypass engine 114A to control whether the in-compute engine 114B is used as part of a memory path or bypassed. For example, the control mechanism may be implemented using a dedicated signal, a control register within the memory, a pre-defined address map, and two types of read commands that correspond to prompt stage operations and auto-regressive operations.

During the prompt stage, processor 120 can perform readouts from the memory 114 while bypassing in-memory compute engine 114B, and the processor 120 executes the compute operations using the processor compute engine 122. As the prompt stage is typically not limited by memory throughput—primarily operating in large batches of data—these operations optimize the performance of the prompt stage. During the auto-regressive stage, the processor 120 can utilize the in-memory compute engine 114B—that forfeits the compute efficiency for effective throughput through memory 114—to read the result vectors. As the compute load during the auto-regressive stage is lower, the tradeoff optimizes the overall inference phase.

Figure 2A:
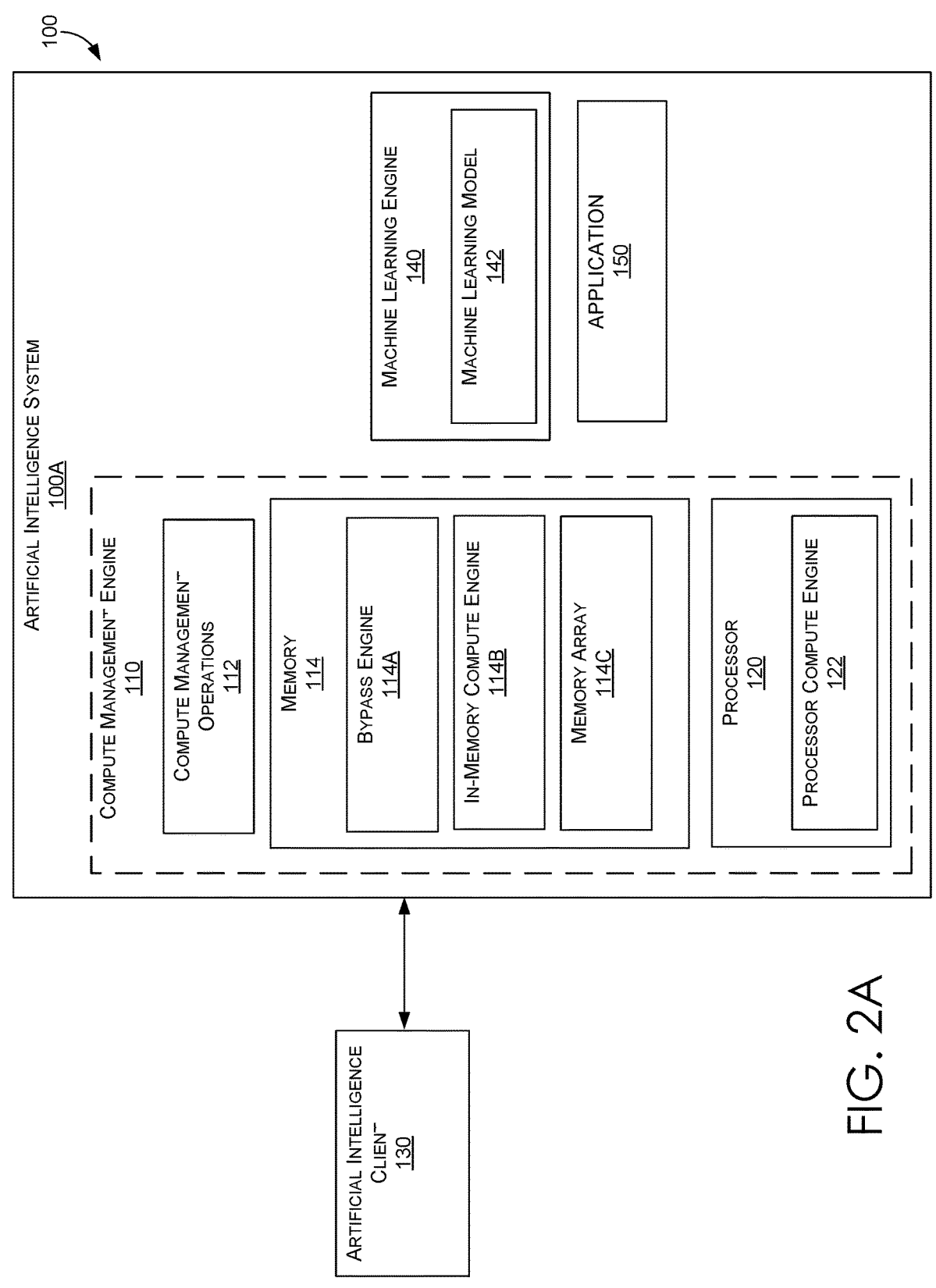
FIG. 2A is a block diagram of an exemplary artificial intelligence system that includes a compute management engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example artificial intelligence system 100A in which methods of the present disclosure may be employed. In particular, FIG. 2A shows a high level architecture of the artificial intelligence system 100A in accordance with implementations of the present disclosure. Among other engines, managers, generators, selectors, or components not shown (collectively referred to herein as "components"), the technical solution environment of artificial intelligence system 100A corresponds to FIGS. 1A and 1B.

With reference to FIG. 2A, FIG. 2A illustrates a cloud computing environment 100 having artificial intelligence system 100A, compute management engine 110 having compute management operations 112, memory 114 having bypass engine 114A, in-memory compute engine 114B, and memory array 114C; processor 120 including processor compute engine 122; artificial intelligence client 130, application client 132, and application interface data 134; and machine learning engine 140 including machine learning model 142 ("LLM 142").

The compute management engine 110 is responsible for providing computing management in an artificial intelligence system. The compute management engine 110 may employ bypass engine 114A that supports dynamically switching between two modes of operation associated with an inference phase of LLM 142. The compute management engine 110 accesses a prompt stage operation associated with a generative AI model (e.g., LLM 142). The generative AI model can be an LLM associated with a plurality of operations that include vector-matrix operations, where a vector or matrix of the plurality of operations are associated with a word embedding, a model parameter, or an intermediate representation of text. The generative AI model is associated with memory (e.g., memory 114) that supports executing operations associated with the generative AI model. Based on the prompt stage operation, the compute management engine 110 causes the prompt stage operation to bypass an in-memory compute engine of the memory, and the prompt stage operation is executed without using the in-memory compute engine (e.g., in-memory compute engine 114B). The compute management engine 110 accesses an auto-regressive stage operation associated with the generative AI model. Based on the auto-regressive stage operation, the compute management engine 110 causes the auto-regressive stage operation to be executed in the in-memory compute engine 114B of the memory 114, and the auto-regressive stage operation is executed using the in-memory compute engine 114B.

The compute management engine 110 provides compute management for prompt stage operations and an auto-regressive stage operations. A prompt stage operation and an auto-regressive stage operation can be associated with a dot product operation (e.g., a vector dot product). The prompt stage operation may support processing input as a batch of new tokens, and the auto-regressive stage operation supports processing individual tokens generated via the generative AI model. The in-memory compute engine 114B is bypassed by the prompt stage operation based on the bypass engine 114A that implement a dedicated signal, a control register, a pre-defined address map, or two types of reads commands that support identifying prompt stage operations and auto-regressive operations.

The compute management engine 110 supports executing the prompt stage operation without using the in-memory compute, where executing the prompt stage operation includes executing memory readouts from the memory without using the in-memory compute and communicating the data to a processor (e.g., processor 120) associated with a processor compute engine (e.g., processor compute engine 122). The compute management engine 110 causes the auto-regressive stage operation to be executed using the in-memory compute engine 114B based on communicating the auto-regressive operation to the in-memory compute engine 114B. The compute management engine 110 supports executing the auto-regressive stage operation using the in-memory compute engine 114B based on the in-memory compute engine 114B computing a dot product result of a first vector and a second vector. It is contemplated that a first type of auto-regressive stage operation is associated with retrieving a vector dot product result of a vector dot product operation, while a second type of auto-regressive stage operation is not associated with retrieving a vector dot product result of a vector dot product operation. As such, a determination can further be made to identify the auto-regressive stage operations of the first type and specifically process them using the in-memory compute engine and identify auto-regressive stage operations of the second type and not process them using the in-memory compute engine. In this way, the second type of auto-regressive stage can also bypass the in-memory compute engine.

The compute management engine 110 includes the processor 120 that is configured to communicate an inference phase operation associated with the generative AI model, the inference phase operation is communicated to memory 114. Based on the communicating the inference phase operation, the processor 120 receives a memory output associated with the inference phase operation, where the memory output is generated without in-memory compute engine 114B of memory 114 when the inference operation is a prompt stage operation, and where the memory output is generated with the in-memory compute engine 114B memory 114 when the inference phase operation is an auto-regressive stage operation. When the inference operation is a prompt stage operation, the memory output is a memory readout that is not associated with in-memory compute engine 114B, and when the inference phase operation is an auto-regressive stage operation, the memory output is a dot product of a first vector and a second vector, where the dot product is executed using in-memory compute engine 114B. The processor 120 uses the memory output to generate a processor output associated with the inference phase operation.

The compute management engine 110 can include a bypass engine 114A that supports dynamically switching between two modes of operation associated with an inference phase for the generative AI model. The bypass engine 114A can be configured to access a first inference operation associated with the generative AI model, and determine that the inference operation is a prompt stage operation. Based on determining that inference operation is a prompt stage operation, the bypass engine 114A causes the prompt stage operation to bypass the in-memory compute engine. The bypass engine 114A accesses a second inference operation associated with the generative AI model and determines that the inference operation is an auto-regressive stage operation. Based on determining that the inference operation is auto-regressive stage operation, causing the auto-regressive stage operation to be executed with the in-memory compute engine. As previously discussed, the bypass engine 114A can be further configured to distinguish a first type of auto-regressive stage operation and a second type of auto-regressive stage operation, and cause the second type of auto-regressive stage operation to bypass the in-memory compute engine 114B. So even if an inference operation is an auto-regressive stage operation it may still not be processed using the in-compute engine 114B.

With reference to FIG. 2B, FIG. 2B illustrates an schematic of an exemplary compute management engine 110 that includes memory 114, bypass engine 114A, in-memory compute engine 114B, and memory array 114C; and processor 120 including processor compute engine 122. As discussed, an inference phase can be associated with two stages a prompt stage and an auto-regressive stage that provides compute management challenges. The prompt stage needs to have efficient compute functionality, thus in-memory compute is not an effective tool for prompt stage operations. The auto-regressive stage does not have a high requirement for compute efficiency; however the auto-regressive stage can be bottlenecked when it comes to bandwidth.

Using in-memory compute during the prompt stage is not efficient. By way of illustration, memory chips are not manufactured with the most advanced processor nodes. For example, memory chips can be limited from a size perspective and also a power perspective that limit the memory chips' compute capacity (e.g., area in silicon and power inefficiencies)—compared to a high-end processor that is capable of efficiently performing complex multiplication operations. Nonetheless, the in-memory compute can be used during the auto-regressive stage because the in-memory compute in the auto-regressive stage is negligible and would not be the cause of the bottleneck in performance. Instead, memory bandwidth is the limitation during the auto-regressive stage. As such, strategically implementing an in-memory compute engine for auto-regressive stage operations can improve the bandwidth of memory—particularly for auto-regressive operations associated with vector dot products. As such, the compute management engine 100A can be employed to provide compute management based on dynamically switching between two modes of operation associated with an inference phase for a generative artificial intelligence (AI) model.

The processor 120 includes the processor compute engine 122 that provides a discrete computational unit (i.e., a highly efficient process node) for the processor that is responsible for efficient compute for inference operations. The processor compute engine 122 is efficient at performing complex multiplication operations because of the silicon and power efficiencies compared to memory with the in-memory compute engine 114B. Memory 114 includes memory array 114C that operates as a storage component (i.e., cells) of the memory 114. Memory 114C communicates with the processor via an interface. For example, processor 120 (e.g., a GPU) uses the processor compute engine 122 to execute processor operations via a memory interface with the memory array 114C. The memory array 114C allows random access to data such that data is transferred to processor 120 for further processing (e.g., calculations, instructions, execution, or data storage). Memory 114 includes bypass engine 114A and in-memory compute engine 114B. It is contemplated that in-memory compute engine 114B and bypass engine 114B can be implemented partially external to the memory 114. Memory 114 can further include control paths to control the bypass engine 114A and in-memory compute engine 114B. The memory control paths support communication associated with accessing, reading, and writing data in the memory 114 and controlling the bypass engine 114A and in-memory compute engine 114B.

The bypass engine 114A can support a variety of ways for switching between two modes—prompt stage mode and auto-regressive stage mode. The bypass engine 114A may be associated with writing a control register, implementing a dedicated signal, a pre-defined address map, or implementing new commands (e.g., a first command associated with prompt stage operations and a second command associated with auto-regressive stage operations) that switch processing of inference operations between modes. For example, a control register may be configured to support disabling the in-memory compute engine 114B for prompt stage mode and enabling the in-memory compute engine 114B for auto-regressive stage mode. In the pre-defined address implementation, a pre-defined address map can be used to determine whether to utilize the in-memory compute engine 114B or not utilize the in-memory compute engine 114B. For example, model weights can be placed in memory addresses that are noted as "in-compute enabled" memory addresses or address spaces divided into bypass regions or not-bypass regions. The pre-defined memory address map may be implemented and used in combination with having a single register bit to globally enable or disable the in-memory compute engine 114B.

In one implementation, processor 120 may have a control path to the bypass engine 114A, where an inference phase operation from processor 120 is determined to be a prompt stage operation or the inference phase operation from the processor is determined to be an auto-regressive stage operation. Processor 120 may also have a control path with in-memory compute engine 114B for executing auto-regressive stage operations. Memory array 114C may have a data path to support communications via in-memory compute engine 114B and bypass engine 114A to processor 120 or communications that bypass in-memory compute engine 114B—directly to bypass engine 114A to the processor 120. Other variations and combinations of control paths, data paths, and control mechanisms for dynamically switching modes for providing compute management are contemplated with embodiments described herein.

Example Methods

With reference to FIGS. 3, 4, and 5, flow diagrams are provided illustrating methods for providing compute management using a compute management engine in an artificial intelligence system. The methods may be performed using the artificial intelligence system described herein. In embodiments, one or more computer-storage media having computer-executable or computer-useable instructions embodied thereon that, when executed, by one or more processors can cause the one or more processors to perform the methods (e.g., computer-implemented method) in the artificial intelligence system (e.g., a computerized system or computing system).

Turning to FIG. 3, a flow diagram is provided that illustrates a method 300 for providing compute management using a compute management engine in an artificial intelligence system. At block 302, access a prompt stage operation associated with a generative AI model. At block 304, cause the prompt stage operation to bypass an in-memory compute engine associated with memory that supports executing operations associated with the generative AI model. At block 306, execute the prompt stage operation without using the in-memory compute engine. At block 308, access an auto-regressive stage operation associated with the generative AI model. At block 310, cause the auto-regressive stage operation to be executed using the in-memory compute engine. At block 312, execute the auto-regressive stage operation using the in-memory compute engine.

Turning to FIG. 4, a flow diagram is provided that illustrates a method 400 for providing compute management using a compute management engine in an artificial intelligence system. At block 402, communicate an inference phase operation associated with a generative AI model. At block 404, based on communicating the inference phase operation, receive a memory output associated with the inference phase operation. The memory is generated without an in-memory compute engine when the inference operation is a prompt stage operation and the memory output is generated with the in-memory compute engine when the inference operation is auto-regressive stage operation. At block 406, using the memory output, generate a processor output associated with the inference phase operation.

Turning to FIG. 5, a flow diagram is provided that illustrates a method 500 for providing compute management using a compute management engine in an artificial intelligence system. At block 502, access a first inference operation associated with a generative AI model. At block 504, determine that the inference operation is a prompt stage operation. At block 506, based determining that the inference operation is the prompt stage operation, cause the prompt stage operation to bypass an in-memory compute engine associated with memory that supports executing operations associated with the generative AI model. At block 508, access a second inference operation associated with the generative AI model. At block 510, determine that the inference operation is an auto-regressive stage operation. At block 512, based on determining that the inference operation is an auto-regressive stage operation, cause the auto-regressive stage operation to be executed with the in-memory compute engine.

Technical Improvement

Embodiments of the present technical solution have been described with reference to several inventive features (e.g., operations, systems, engines, and components) associated with an artificial intelligence system. Inventive features described include: operations, interfaces, data structures, and arrangements of computing resources associated with providing the functionality described herein relative with reference to a compute management engine. Functionality of the embodiments of the present technical solution have further been described, by way of an implementation and anecdotal examples—to demonstrate that the operations (e.g., dynamically switching between two modes of operation associated with an inference phase for a generative artificial intelligence (AI) model) for providing the compute management engine. The compute management engine is a solution to a specific problem (e.g., limitations in efficiently performing inference phase operations for a generative AI model) in artificial intelligence technology. The compute management engine improves computing operations associated with providing compute management using a compute management engine of an artificial intelligence system. Overall, these improvements result in less CPU computation, smaller memory requirements, and increased flexibility in artificial intelligence systems when compared to previous conventional artificial intelligence system operations performed for similar functionality.

ADDITIONAL SUPPORT FOR DETAILED DESCRIPTION

Example Distributed Computing System Environment

Figure 6:
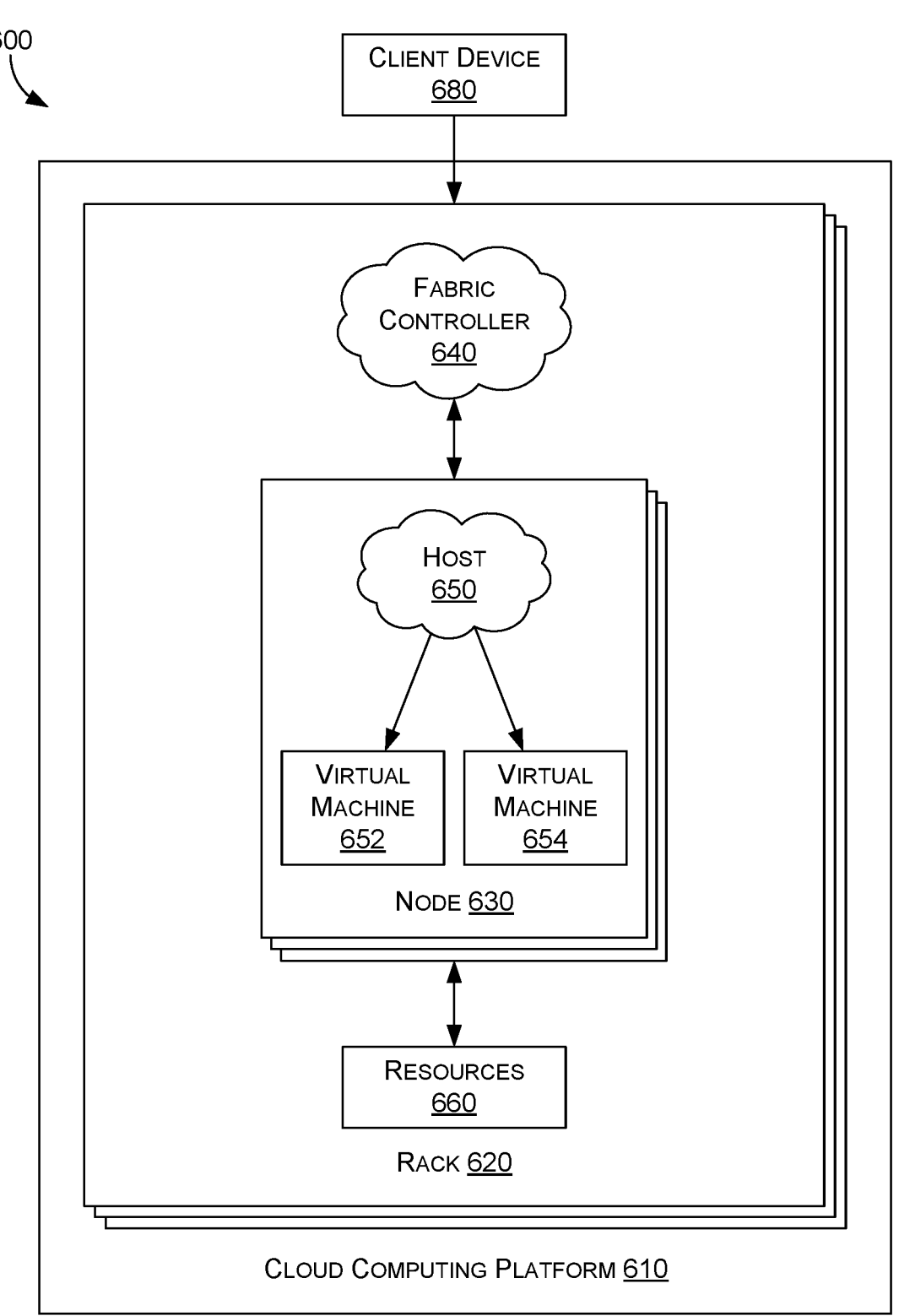
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing platform 610 in a data center can be configured to host and support operation of endpoints of a particular service application. Cloud computing platform 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
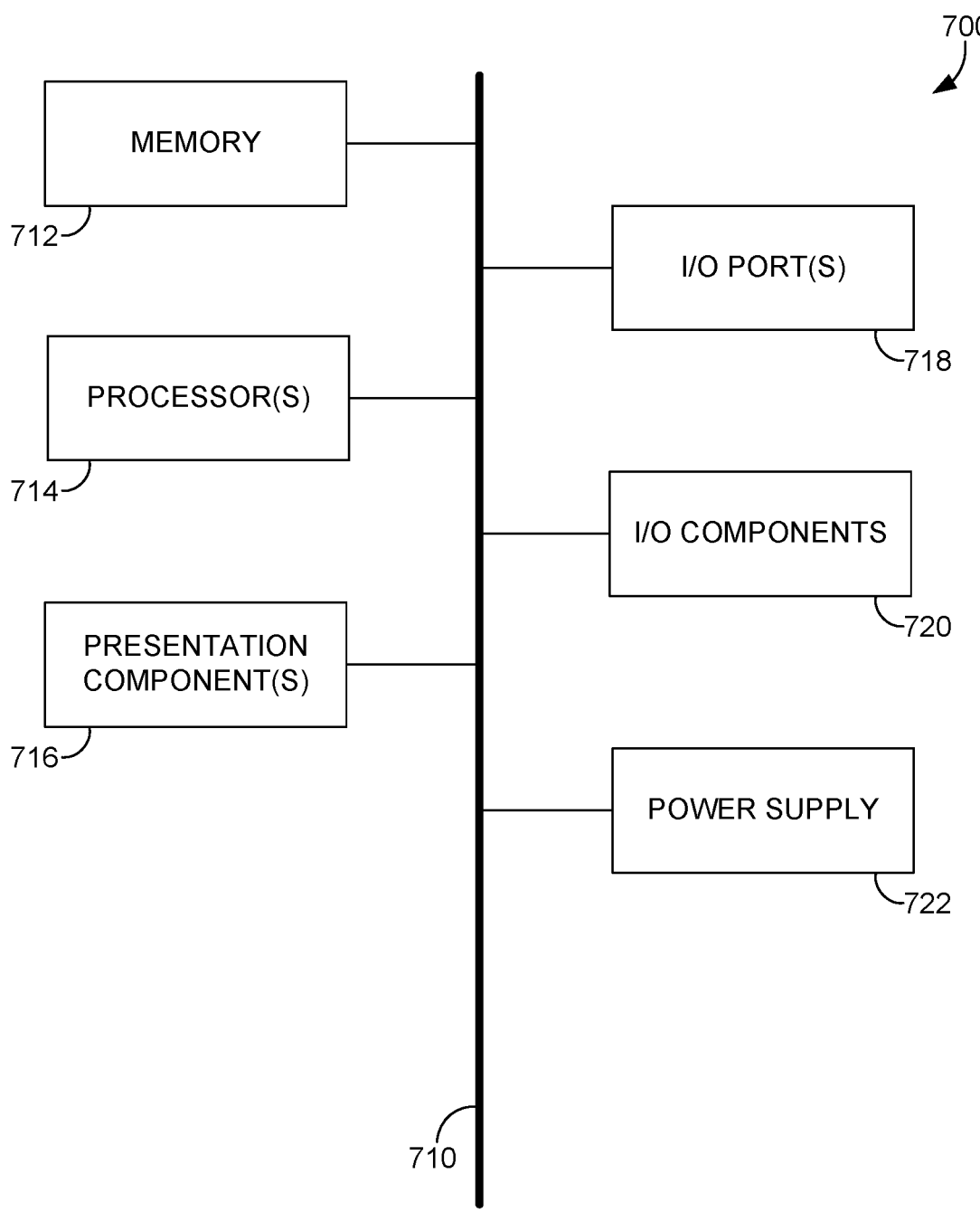
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   computer memory storing computer-useable instructions
   that, when used by the one or more computer processors, cause the one or more computer processors to perform operations, the operations comprising:

accessing a prompt stage operation associated with a generative artificial intelligence (AI) model, the generative AI model is associated with memory that supports executing generative AI model operations associated with the generative AI model;

wherein the prompt stage operation is associated with a prompt stage of an inference phase of the generative AI model;

based on the prompt stage operation, dynamically causing the prompt stage operation to bypass an in-memory compute engine of the memory;

executing the prompt stage operation without using the in-memory compute engine;

accessing an auto-regressive stage operation associated with the generative AI model, wherein the auto-regression stage operation is associated with an auto-regression stage of the inference phase of the generative AI model;

based on the auto-regressive stage operation, dynamically causing the auto-regressive stage operation to be executed using the in-memory compute engine of the memory; and executing the auto-regressive stage operation using the in-memory compute engine.

2. The system of claim 1, wherein the generative AI model is a large language model ("LLM") associated with a plurality of operations comprising vector-matrix operations, wherein a vector or a matrix of the plurality of operations is associated with a word embedding, a model parameter, or an intermediate representation of text.

3. The system of claim 1, wherein the prompt stage operation or the auto-regressive stage operation is associated with a dot product operation.

4. The system of claim 1, wherein the prompt stage operation supports processing input as a batch of new tokens, and wherein the auto-regressive stage operation supports processing individual tokens generated via the generative AI model.

5. The system of claim 1, wherein bypassing the in-memory compute engine for the prompt stage operation is based on a bypass engine that implements one or more of: a dedicated signal, a control register, a pre-defined address map, or two types of read commands that support identifying prompt stage operations and auto-regressive stage operations.

6. The system of claim 1, wherein executing the prompt stage operation without using the in-memory compute engine comprises executing memory readouts from the memory without using the in-memory compute engine and communicating data to a processor associated with a processor compute engine.

7. The system of claim 1, wherein causing the auto-regressive stage operation to be executed using the in-memory compute engine comprises communicating the auto-regressive operation to the in-memory compute engine.

8. The system of claim 1, wherein executing the auto-regressive stage operation using the in-memory compute engine comprises computing a dot product result of a first vector and a second vector.

9. The system of claim 1, the operation further comprising:

communicating an inference phase operation associated with the generative artificial intelligence (AI) model, the inference phase operation is communicated to the memory;

based on the communicating the inference phase operation, receiving a memory output associated with the inference phase operation, wherein the memory output is generated without the in-memory compute engine of the memory when the inference phase operation is the prompt stage operation, and wherein the memory output is generated with the in-memory compute engine of the memory when the inference phase operation is the auto-regressive stage operation; and using the memory output, generating a processor output associated with the inference phase operation.

10. The system of claim 1, further comprising a bypass engine configured to execute the operations comprising:

accessing a first inference phase operation associated with the generative artificial intelligence model;

determining that the first inference phase operation is the prompt stage operation;

based on determining that the first inference phase operation is the prompt stage operation, causing the prompt stage operation to bypass the in-memory compute engine;

accessing a second inference phase operation associated with the generative AI model;

determining that the second inference phase operation is the auto-regressive stage operation; and based on determining that the second inference phase operation is the auto-regressive stage operation, causing the auto-regressive stage operation to be executed with the in-memory compute engine.

11. One or more computer-storage media having computer-executable instructions embodied thereon that, when executed by a computing system having a processor and memory, cause the processor to perform operations, the operations comprising:

communicating an inference phase operation associated with a generative artificial intelligence (AI) model, the inference phase operation is communicated to memory that supports executing generative AI model operations associated with the generative AI model;

based on the communicating the inference phase operation, receiving a memory output associated with the inference phase operation, wherein the memory output is generated without an in-memory compute engine of the memory when the inference phase operation is a prompt stage operation, wherein the prompt stage operation is associated with a prompt stage of an inference phase of the generative AI model, and wherein the memory output is generated with the in-memory compute engine of the memory when the inference phase operation is an auto-regressive stage operation wherein the auto-regression stage operation is associated with an auto-regression stage of the inference phase of the generative AI model; and using the memory output, generating a processor output associated with the inference phase operation.

12. The media of claim 11, wherein the inference phase operation is a processor compute engine that executes the inference phase operation using the memory output generated without the in-memory compute engine.

13. The media of claim 11, wherein, when the inference phase operation is the prompt stage operation, the memory output is a memory readout that is not associated with the in-memory compute engine.

14. The media of claim 11, wherein, when the inference phase operation is the auto-regressive stage operation, the memory output is a dot product of a first vector and a second vector, wherein the dot product is executed using the in-memory compute engine.

15. The media of claim 11, the operations further comprising:

accessing a first inference phase operation associated with the generative artificial intelligence model;

determining that the first inference phase operation is the prompt stage operation;

based on determining that the first inference phase operation is the prompt stage operation, causing the prompt stage operation to bypass the in-memory compute engine;

accessing a second inference phase operation associated with the generative AI model;

determining that the second inference phase operation is the auto-regressive stage operation; and based on determining that the second inference phase operation is the auto-regressive stage operation, causing the auto-regressive stage operation to be executed with the in-memory compute engine.

16. A computer-implemented method, the method comprising:

accessing a first inference phase operation associated with a generative artificial intelligence (AI) model, the generative AI model is associated with memory that support executing operations associated with the generative AI model;

determining that the first inference phase operation is a prompt stage operation, wherein the prompt stage operation is associated with a prompt stage of an inference phase of the generative AI model;

based on determining that the first inference phase operation is the prompt stage operation, dynamically causing the prompt stage operation to bypass an in-memory compute engine;

accessing a second phase inference operation associated with generative AI model;

determining that the second inference phase operation is an auto-regressive stage operation, wherein the auto-regression stage operation is associated with an auto-regression stage of the inference phase of the generative AI model; and based on determining that the second inference phase operation is the auto-regressive stage operation, dynamically causing the auto-regressive stage operation to be executed with the in-memory compute engine.

17. The method of claim 16, wherein bypassing the in-memory compute engine for the prompt stage operation is based on a bypass engine that implements one or more of: a dedicated signal, a control register, a pre-defined address map, or two types of read commands corresponding to prompt stage operations and auto-regressive stage operations.

18. The method of claim 16, the method further comprising executing the first inference phase operation without using the in-memory compute engine.

19. The method of claim 16, the method further comprising executing the second inference phase operation using the in-memory compute engine.

20. The method of claim 16, wherein the prompt stage operation supports processing input as a batch of new tokens, and wherein the auto-regressive stage operation supports processing individual tokens generated via the generative AI model.

* * * * *